US012801065B2

(12) United States Patent
Yoo et al.

(10) Patent No.: US 12,801,065 B2
(45) Date of Patent: Nov. 17, 2026

(54) TRANSFERRING WASTE TONER REMOVED FROM INTERMEDIATE TRANSFER BELT

(71) Applicant: HEWLETT-PACKARD DEVELOPMENT COMPANY, L.P., Spring, TX (US)

(72) Inventors: Daehyung Yoo, Seongnam Si (KR); Seungkyu Lee, Seongnam Si (KR); Suhyun Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 19/119,748

(22) PCT Filed: Apr. 21, 2023

(86) PCT No.: PCT/US2023/019498

§ 371 (c)(1),
(2) Date: Apr. 9, 2025

(87) PCT Pub. No.: WO2024/091295

PCT Pub. Date: May 2, 2024

(65) Prior Publication Data

US 2026/0140463 A1 May 21, 2026

(30) Foreign Application Priority Data

Oct. 26, 2022 (KR) ........................ 10-2022-0139434

(51) Int. Cl.
*G03G 15/16* (2006.01)
*G03G 21/10* (2006.01)
(Continued)

(52) U.S. Cl.
CPC ....... *G03G 15/161* (2013.01); *G03G 15/1615* (2013.01); *G03G 21/105* (2013.01);
(Continued)

(58) Field of Classification Search
CPC ............. G03G 15/161; G03G 15/1615; G03G 21/105; G03G 21/12; G03G 21/168
(Continued)

(56) References Cited

U.S. PATENT DOCUMENTS 8,903,299 B2 * 12/2014 Lee ........................ G03G 21/12
399/358
9,823,618 B2 * 11/2017 Ueno .................. G03G 21/105
(Continued)

FOREIGN PATENT DOCUMENTS

| | | | |
|---|---|---|---|
| JP | 2008-216278 | A | 9/2008 |
| KR | 10-2021-0078148 | A | 6/2021 |
| WO | 2022/025963 | A1 | 2/2022 |

*Primary Examiner* — Hoan H Tran
(74) *Attorney, Agent, or Firm* — Foley & Lardner LLP

(57) ABSTRACT

A printing apparatus can include a photoconductor on which a toner image is formed, an intermediate transfer belt to which the toner image is transferred, and a. belt frame to support the intermediate transfer belt. The printing apparatus can include a. belt cleaner including an accommodation portion and a discharge duct, the accommodation portion to accommodate waste toner removed from the intermediate transfer belt, and the discharge duct extending from the accommodation portion in a width direction of the intermediate transfer belt and including a first outlet through which the waste toner is discharged. The discharge duct can be located inside the belt frame in the width direction.

16 Claims, 11 Drawing Sheets

(51) Int. Cl.
*G03G 21/12* (2006.01)
*G03G 21/16* (2006.01)

(52) U.S. Cl.
CPC ........... *G03G 21/12* (2013.01); *G03G 21/168* (2013.01); *G03G 2215/1661* (2013.01)

(58) Field of Classification Search
USPC ........................................ 399/101, 302, 308
See application file for complete search history.

(56) References Cited

U.S. PATENT DOCUMENTS

| | | | | |
|---|---|---|---|---|
| 2003/0108365 | A1* | 6/2003 | Kabai | G03G 15/161 399/297 |
| 2014/0186071 | A1 | 7/2014 | Sato | |
| 2014/0356043 | A1 | 12/2014 | Tokuda | |
| 2017/0003627 | A1 | 1/2017 | Inada | |
| 2019/0369530 | A1 | 12/2019 | Kubota et al. | |

* cited by examiner

TRANSFERRING WASTE TONER REMOVED FROM INTERMEDIATE TRANSFER BELT

CROSS-REFERENCE TO RELATED APPLICATIONS

This application is a U.S. National Stage Entry under 35 U.S.C. § 371 of International Application No.: PCT/US2023/019498 filed Apr. 21, 2023 which priority to Korean Patent Application No.: 2022-0139434 filed on Oct. 26, 2022 both of which are incorporated herein by reference in their entireties.

BACKGROUND

An electrophotographic printing apparatus forms a visible toner image on a photoconductor by supplying a toner accommodated in a developing device to an electrostatic latent image formed on the photoconductor, transfers the toner image to a print medium, and fuses the transferred toner image to the print medium. The toner image may be transferred to the print medium via an intermediate transfer belt. Waste toner remaining on the intermediate transfer belt after transfer is removed by a belt cleaner. The removed waste toner is accommodated in a waste toner container.

DETAILED DESCRIPTION

Figure 1:
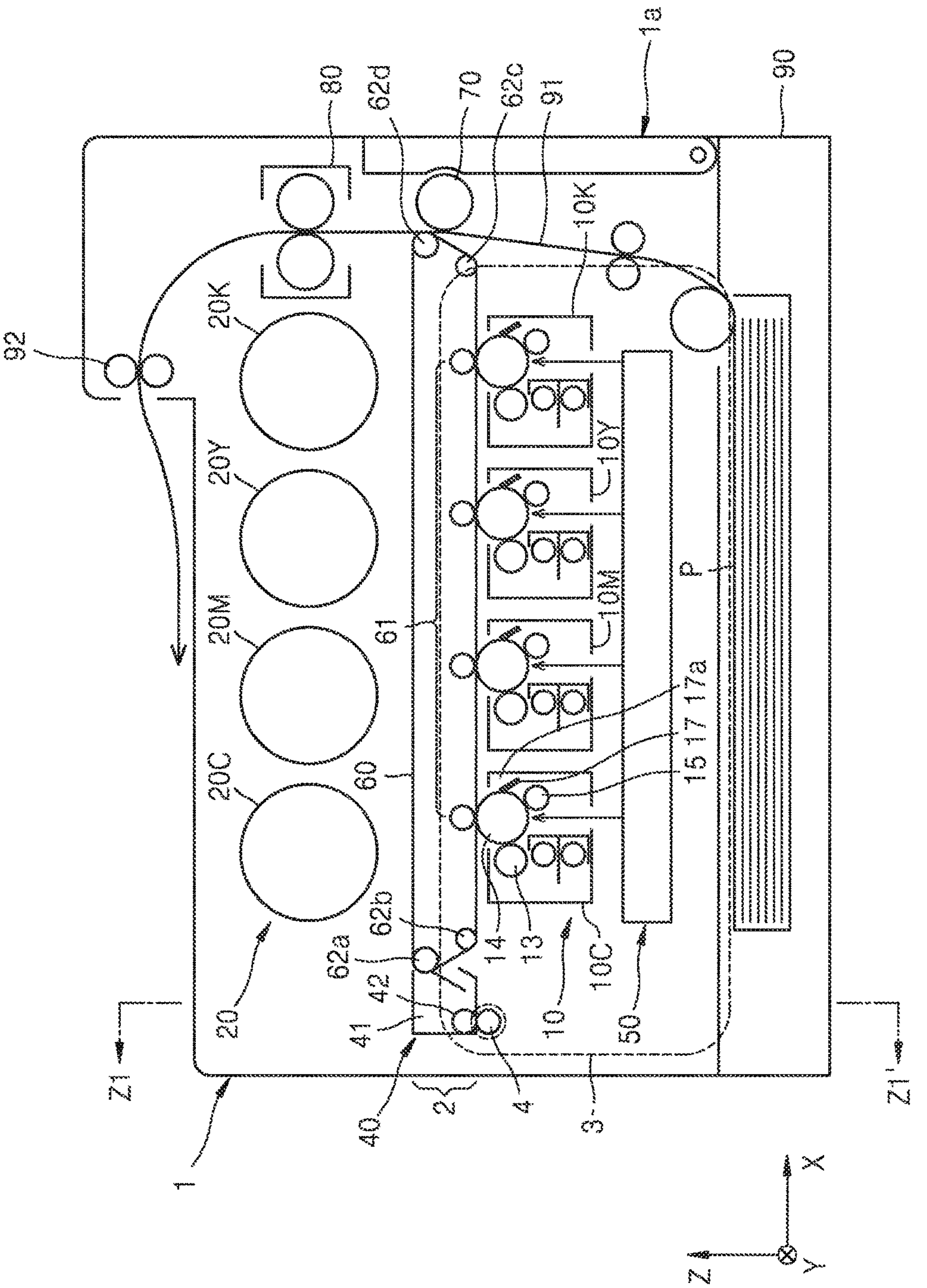
FIG. 1 is a schematic configuration diagram of an example of a printing apparatus consistent with the disclosure.

An electrophotographic printing apparatus includes an intermediate transfer belt to which a toner image formed on a photoconductor is temporarily transferred. After the toner image is transferred from the intermediate transfer belt to a print medium, untransferred toner remains on the intermediate transfer belt. The residual toner is removed from the intermediate transfer belt by a belt cleaner. The removed waste toner is accommodated in a waste toner container. The waste toner container can be arranged on one side of the intermediate transfer belt in a width direction. One end (e.g., a discharge duct) of the belt cleaner in the width direction extends in the width direction and can be inserted into the waste toner container. The intermediate transfer belt may be a consumable that is replaced when its service life has expired.

An intermediate transfer belt assembly including the intermediate transfer belt and the belt cleaner may be removed from a main body of the printing apparatus when the service life of the intermediate transfer belt has expired, and a new intermediate transfer belt assembly can be mounted on the main body. However, because one end of the belt cleaner is inserted into the waste toner container, the waste toner container may be removed before removing the intermediate transfer belt assembly from the main body. In addition, because the discharge duct penetrates a main frame of the main body and protrudes in the width direction of the intermediate transfer belt assembly, when the intermediate transfer belt assembly is slid in a driving direction of the intermediate transfer belt, the discharge duct may be caught on the main frame of the main body. Accordingly, after the belt cleaner is separated from the intermediate transfer belt assembly, the intermediate transfer belt assembly may be slid in the driving direction to be removed from the main body.

Due to the above replaceable structure, the intermediate transfer belt assembly may not be a customer replaceable unit (CRU). Instead, to replace the intermediate transfer belt assembly a professional after-service engineer may be used. This may lead to an increase in post-management costs from the viewpoint of a seller of printing apparatuses and may result in an increase in maintenance costs from the viewpoint of a user.

Examples can provide an intermediate transfer belt assembly that is replaceable by a customer. Examples include a printing apparatus having a structure in which an intermediate transfer belt assembly including a belt cleaner may be replaced by a customer. Examples include an intermediate transfer belt assembly as a CRU and a printing apparatus employing the intermediate transfer belt assembly.

An example printing apparatus can include a main body. The main body may include a photoconductor on which a toner image is formed. The printing apparatus can include an intermediate transfer belt to which the toner image is transferred, a belt frame to support the intermediate transfer belt, and a belt cleaner including an accommodation portion and a discharge duct. The accommodation portion can accommodate waste toner removed from the intermediate transfer belt, and the discharge duct can extend from the accommodation portion in a width direction of the intermediate transfer belt and can be provided with a first outlet through which the waste toner is discharged. The intermediate transfer belt, the belt frame, and the belt cleaner may form a replaceable intermediate transfer belt assembly. The discharge duct can be located inside the belt frame in the width direction. In such an example, because the discharge duct does not interfere with a main frame of the main body of the printing apparatus, the intermediate transfer belt assembly may be slid in a driving direction of the intermediate transfer belt to be mounted/removed on/from the main body of the printing apparatus.

For example, the discharge duct may extend in the width direction from one end of the accommodation portion in the width direction. For example, the belt cleaner may include a first conveying member, for example, a first auger, to convey the waste toner to the first outlet. The first conveying member may be rotated in connection with one of a plurality of support rollers that support and drive the intermediate transfer belt.

For example, the waste toner container may be located outside the belt frame in the width direction. A conveying duct may be provided in the main body to receive the waste toner from the discharge duct and convey the waste toner to the waste toner container. For example, the conveying duct may have a first end and a second end. The first end can have an inlet facing the first outlet of the discharge duct into which the waste toner flows. The second end can be inserted into the waste toner container. The second end can have a second outlet through which the waste toner is discharged into the waste toner container. For example, the waste toner inside the conveying duct may be conveyed by a second conveying member, for example, a second auger. The second conveying member may convey the waste toner to the waste toner container while being rotated inside the conveying duct. The second conveying member may be rotated in connection with one of the plurality of support rollers. For example, the second conveying member may be rotated in connection with the first conveying member.

An example printing apparatus may include a main body including a photoconductor on which a toner image is formed, an intermediate transfer belt assembly including an intermediate transfer belt to which the toner image is transferred, a belt frame to support the intermediate transfer belt, and a belt cleaner to remove waste toner from the intermediate transfer belt. The intermediate transfer belt assembly can be mounted on and removed from the main body in a driving direction of the intermediate transfer belt, a waste toner container, and a conveying duct provided in the main body, and can be connected to the belt cleaner when the intermediate transfer belt assembly is mounted on the main body to form a discharge passage for the waste toner from the belt cleaner to the waste toner container.

An example intermediate transfer belt assembly may include an intermediate transfer belt, a belt frame to support the intermediate transfer belt, an accommodation portion to accommodate waste toner removed from the intermediate transfer belt, and a discharge duct extending from the accommodation portion in a width direction of the intermediate transfer belt and provided with an outlet through which the waste toner is discharged. The discharge duct may be located inside the belt frame in the width direction.

Hereinafter, examples of the intermediate transfer belt assembly and the printing apparatus will be described in detail with reference to the accompanying drawings. In addition, elements having substantially the same functional configuration are denoted by the same reference numerals, and thus, redundant descriptions thereof will be omitted.

FIG. 1 is a schematic configuration diagram of an example of a printing apparatus consistent with the disclosure. The example printing apparatus can print a color image on a print medium P by using an electrophotographic method. For example, in FIG. 1, an X direction represents a driving direction of an intermediate transfer belt 60, and a Y direction represents a width direction of the intermediate transfer belt 60. A Z direction is a direction perpendicular to the X direction and the Y direction. Referring to FIG. 1, an example of the printing apparatus may include a main body 1 having a door 1*a* and an intermediate transfer belt assembly 2 that may be mounted on and removed from the main body 1. The main body 1 may include a photoconductor 14 on which a toner image is formed. A waste toner container 3 may be located on one side of the intermediate transfer belt assembly 2 in the width direction Y. The waste toner container 3 may be mounted on and removed from the main body 1. A conveying duct 4 can form a discharge passage for waste toner from the intermediate transfer belt assembly 2 to the waste toner container 3.

An electrostatic latent image can be formed on a surface of the photoconductor 14, and a toner image can be formed on the surface of the photoconductor 14 by supplying toner to the electrostatic latent image and developing the electrostatic latent image. The photoconductor 14 may be implemented in the form of a photosensitive drum including, for example, a conductive metal pipe and a photosensitive layer formed on an outer circumference of the conductive metal pipe. The main body 1 may include a plurality of developing devices 10, an exposure device 50, and a fuser 80.

For example, the developing device 10 may be an integrated developing device including a developing roller 13 and the photoconductor 14. A charging roller 15 is an example of a charger that charges the photoconductor 14 to have a more uniform surface electric potential. Instead of the charging roller 15, a charging brush, a corona charger, etc. may be employed. A cleaning member 17 can remove foreign substances including toner (hereinafter, referred to as waste toner) remaining on the surface of the photoconductor 14 after an intermediate transfer process described below. The cleaning member 17 may be, for example, a cleaning blade that comes into contact with the surface of the photoconductor 14 to scrape off the waste toner. The waste toner removed from the surface of the photoconductor 14 may be accommodated in the waste toner container 3 described below via a waste toner container 17*a*.

A plurality of developer cartridges 20 can be connected to the plurality of developing devices 10, respectively, and developers accommodated in the plurality of developer cartridges 20 are supplied to the plurality of developing devices 10, respectively. For example, the plurality of developing devices 10 may include a plurality of developing devices 10C, 10M, 10Y, and 10K that form toner images of cyan, magenta, yellow, and black colors, respectively. The plurality of developer cartridges 20 may include a plurality of developer cartridges 20C, 20M, 20Y, and 20K that accommodate developers of cyan, magenta, yellow, and black colors, respectively. When the developer accommodated in the developer cartridge 20 is consumed, the developer cartridge 20 may be replaced with a new developer cartridge 20, or a new developer may be filled in the developer cartridge 20.

The exposure device 50 can scan a plurality of light beams modulated according to image information of each color to the photoconductors 14 of the plurality of developing devices 10C, 10M, 10Y, and 10K, respectively, to form electrostatic latent images on the photoconductors 14. A developing bias voltage can be applied to the developing rollers 13 of the plurality of developing devices 10C, 10M, 10Y, and 10K to develop toner onto the corresponding photoconductors 14. As a result, visible toner images are formed on the surfaces of the plurality of photoconductors 14.

The intermediate transfer belt 60 can be supported by support rollers 62*a*, 62*b*, 62*c*, and 62*d* and is driven in the X direction. Four intermediate transfer rollers 61 can face the photoconductors 14 of the developing devices 10C, 10M, 10Y, and 10K with the intermediate transfer belt 60 therebetween. When an intermediate transfer bias voltage is applied to the four intermediate transfer rollers 61, the toner images developed on the photoconductors 14 can be intermediately transferred to the intermediate transfer belt 60. A transfer roller 70 can face the support roller 62*d* with the intermediate transfer belt 60 therebetween. The print medium P loaded on a paper feeding tray 90 can be transported along a paper feeding path 91 and transported between the transfer roller 70 and the intermediate transfer belt 60. The toner image on the intermediate transfer belt 60 can be transferred to the print medium P by a transfer bias voltage applied to the transfer roller 70. When the print medium P passes through the fuser 80, the toner image can be fused to the print medium P by heat and pressure. The print medium P on which fusing is completed can be discharged by a discharge roller 92.

The intermediate transfer belt assembly 2 may include the intermediate transfer belt 60, a belt frame (e.g., bell frame 63 illustrated in FIG. 3), and a belt cleaner 40. The intermediate transfer belt 60 can be supported by the belt frame. For example, the support rollers 62*a*, 62*b*, 62*c*, and 62*d* may be rotatably supported by the belt frame, and the intermediate transfer belt 60 may be supported by the support rollers 62*a*, 62*b*, 62*c*, and 62*d* and circulated in the driving direction X. The belt cleaner 40 can remove foreign substances including toner (hereinafter, referred to as waste toner) remaining on a surface of the intermediate transfer belt 60 after the above-described transfer is performed. The belt cleaner 40 can include an accommodation portion 41 and a discharge duct 42. As shown in FIG. 1, in an example in which the intermediate transfer belt assembly 2 is mounted on the main body 1, the discharge duct 42 can be connected to the conveying duct 4 provided in the main body 1. The waste toner removed from the intermediate transfer belt 60 by the belt cleaner 40 may be discharged to the waste toner container 3 via the discharge duct 42 and the conveying duct 4.

Figure 2:
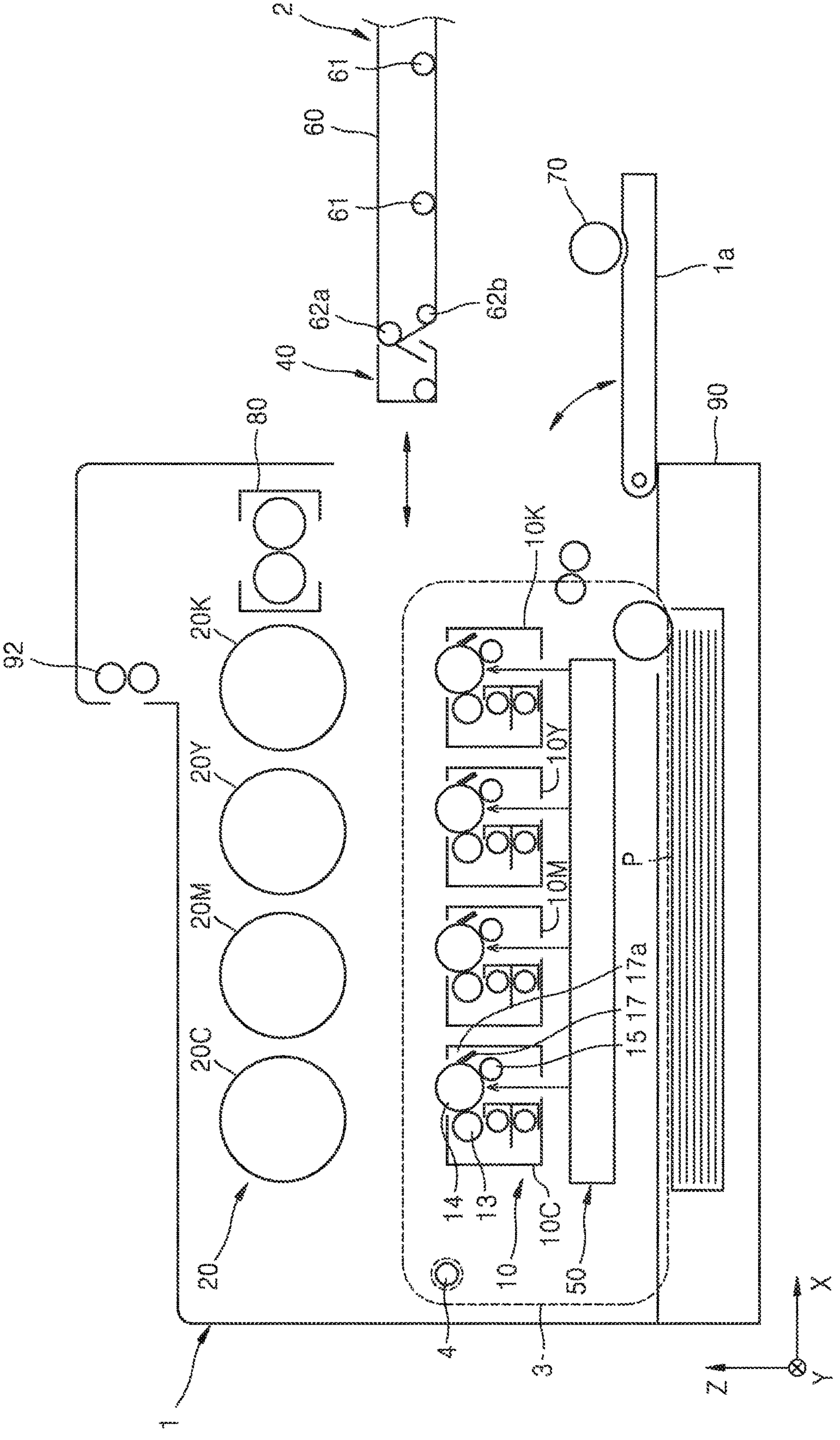
FIG. 2 is a schematic configuration diagram of a printing apparatus showing mounting/removal of an intermediate transfer belt assembly consistent with the disclosure.

The intermediate transfer belt assembly 2 may be slid in the driving direction X to be mounted/removed on/from the main body 1. FIG. 2 is a schematic configuration diagram of a printing apparatus showing mounting/removal of the intermediate transfer belt assembly 2 consistent with the disclosure. The printing apparatus can include developer cartridges 20 (e.g., developer cartridges 20C, 20M, 20Y, 20K), fuser 80, discharge roller 92, support rollers 62*a* and 62*b*, transfer rollers 61 and 70, paper feeding tray 90, developing devices 10 (e.g., developing devices 10C, 10 M, 10Y, 10K), access to a print medium P, conveying duct 4, photoconductor 14, developing roller 13, cleaning member 17, waste toner container 17*a*, and charging roller 15, among others.

Referring to FIG. 2, a door 1*a* can open and close a portion of the main body 1, for example, a portion of the main body 1 in the driving direction X. To remove the intermediate transfer belt assembly 2 from the main body 1, the door 1*a* may be opened, and the intermediate transfer belt assembly 2 may be slid in the driving direction X. In this example, a discharge duct (e.g., discharge duct 42 illustrated in FIG. 1) can be separated from the conveying duct 4 provided in the main body 1. Accordingly, the intermediate transfer belt assembly 2 may be removed from the main body 1 by sliding the intermediate transfer belt assembly 2 including the belt cleaner 40 in the driving direction X. As the intermediate transfer belt assembly 2 is mounted on the main body 1, as shown in FIG. 1, the discharge duct may be connected to the conveying duct 4 provided in the main body 1 such that the waste toner removed from the intermediate transfer belt 60 may be discharged to the waste toner container 3 via the discharge duct and the conveying duct 4.

As described above, the intermediate transfer belt assembly 2 including the belt cleaner 40 may be replaced without a process of separating the belt cleaner 40 from the intermediate transfer belt assembly 2. Accordingly, the intermediate transfer belt assembly 2 may be a CRU, and post-management costs and maintenance costs may be reduced. Hereinafter, example structures of the belt cleaner 40 and the conveying duct 4 are described.

Figure 3:
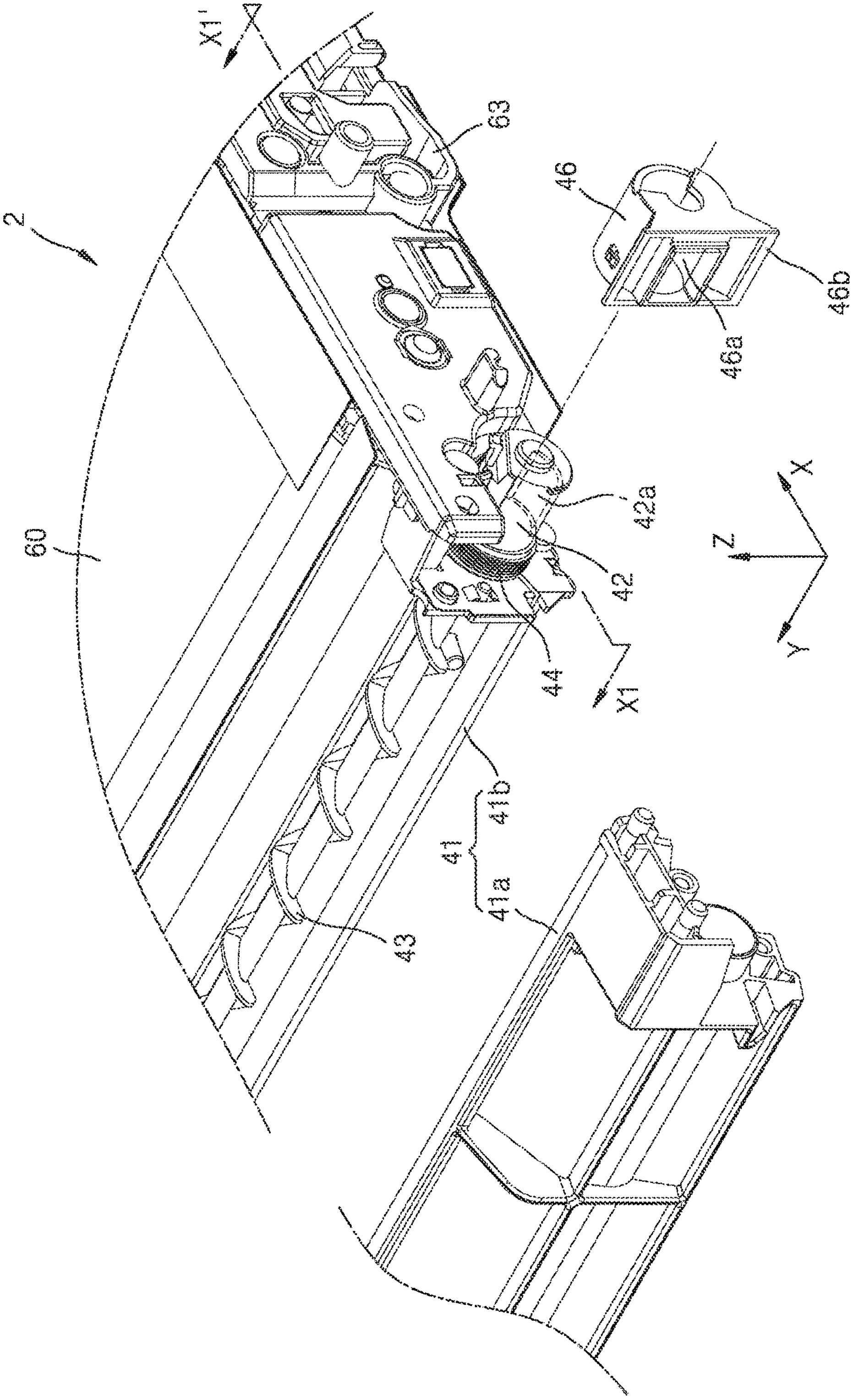
FIG. 3 is a partially exploded perspective view of an example of a belt cleaner consistent with the disclosure.

FIG. 3 is a partially exploded perspective view of an example of the belt cleaner (e.g., belt cleaner 40 illustrated in FIGS. 1 and 2) consistent with the disclosure. The belt cleaner may be within the main body (e.g., main body 1 illustrated in FIGS. 1 and 2). Referring to FIG. 3, the belt cleaner may include an accommodation portion 41 in which the waste toner removed from the intermediate transfer belt 60 is accommodated, and the discharge duct 42 extending from the accommodation portion 41 in the width direction Y. Although not shown in the drawing, a cleaning member for removing residual toner from the surface of the intermediate transfer belt 60 may be arranged inside the accommodation portion 41. For example, the cleaning member may be a cleaning blade that comes into contact with the surface of the intermediate transfer belt 60 to scrape off the residual toner. For example, the cleaning member may be a rotating brush that removes the toner from the surface of the intermediate transfer belt 60. The accommodation portion 41 may be formed by, for example, first and second cleaner frames 41*a* and 41*b*. The first cleaner frame 41*a* can be connected to the belt frame 63. As the second cleaner frame 41*b* can be coupled to the first cleaner frame 41*a*, the accommodation portion 41 accommodating the waste toner therein may be formed.

The discharge duct 42 can be located inside the belt frame 63 in the width direction Y. The discharge duct 42 may not protrude from the belt frame 63 in the width direction Y. In other words, the discharge duct 42 can be located in a vertical projection area of the intermediate transfer belt assembly 2, that is, a projection area in the Z direction. When the intermediate transfer belt assembly 2 is moved in the driving direction X, the discharge duct 42 may not interfere with other structures in the main body located outside the intermediate transfer belt assembly 2 in the width direction Y. Accordingly, the intermediate transfer belt assembly 2 including the belt cleaner 40 may be slid in the driving direction X to be mounted on and removed from the main body.

The discharge duct 42 may extend, for example, in the width direction Y from one end of the accommodation portion 41 in the width direction Y. The discharge duct 42 can include a first outlet 42*a* through which the waste toner is discharged. One end of the discharge duct 42 in the width direction Y may not protrude from the belt frame 63. In addition, the discharge duct 42 may not protrude from the belt frame 63 in the Z direction. Accordingly, the size of a space to be provided in the main body to allow the intermediate transfer belt assembly 2 to be slid in the driving direction X may be reduced.

The belt cleaner may include a first conveying member (first auger) 43 that conveys the waste toner inside the accommodation portion 41 to the first outlet 42*a*. For example, the first conveying member 43 may include a rotation shaft extending in the width direction Y, and a spiral wing formed on the rotation shaft. The first conveying member 43 may be rotated in connection with one of the plurality of support rollers (e.g., support rollers 62*a*, 62*b*, 62*c*, and 62*d* illustrated in FIGS. 1 and 2). For example, the first conveying member 43 may be rotated in connection with the support roller (e.g., support roller 62*a* illustrated in FIGS. 1 and 2) located closest thereto.

Figure 4:
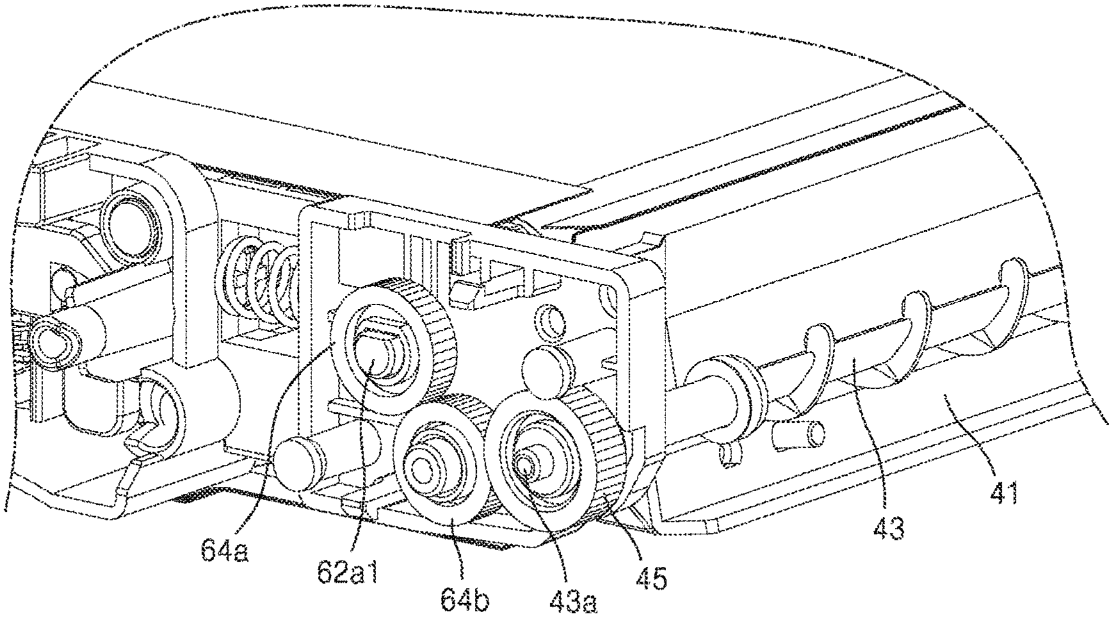
FIG. 4 is a partial perspective view of an example of a structure for rotating a first conveying member consistent with the disclosure.

FIG. 4 is a partial perspective view of an example of a structure for rotating the first conveying member 43 consistent with the disclosure. Referring to FIG. 4, a gear 64*a* can be coupled to one end of a rotation shaft 62*al* of the support roller (e.g., support roller 62*a* illustrated in FIG. 2). A gear 45 can be coupled to one end of a rotation shaft 43*a* of the first conveying member 43. The gear 64*a* can be engaged with the gear 45 via a gear 64*b*. As a result, the first conveying member 43 may be rotationally driven without using a separate actuator, such as a motor.

Figure 5:
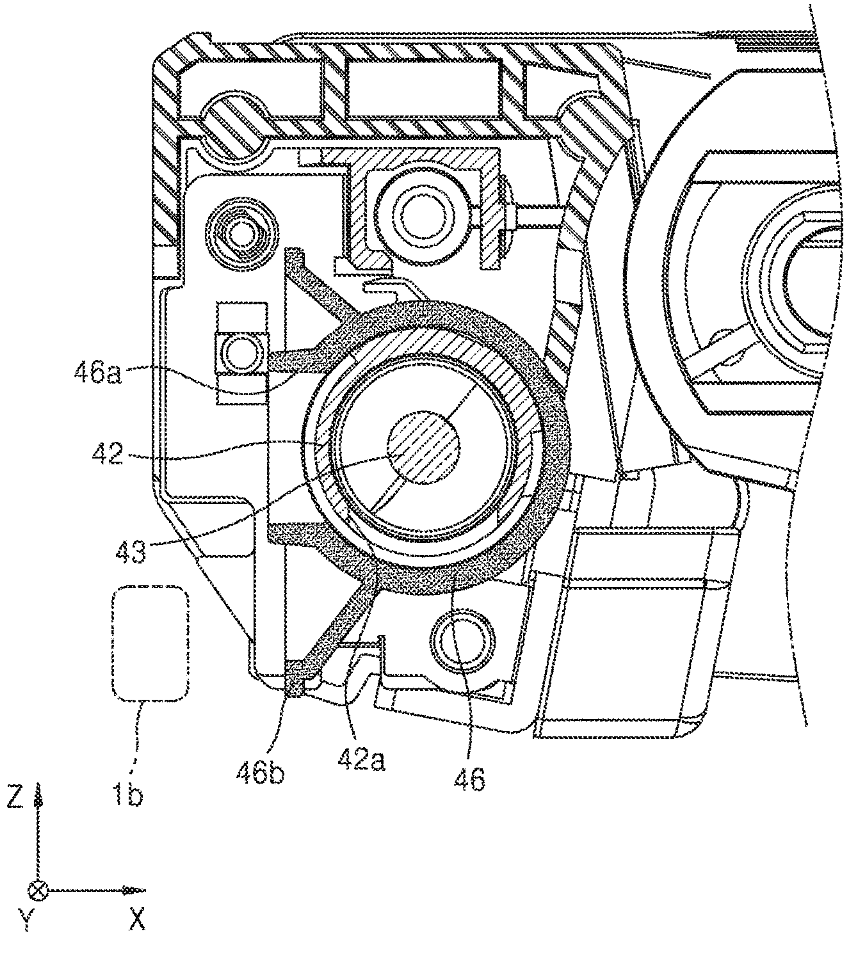
FIG. 5 is a cross-sectional view taken along line X1-X1' of FIG. 3, showing a state in which a shutter is located at a closed position to block a first outlet consistent with the disclosure.
Figure 6:
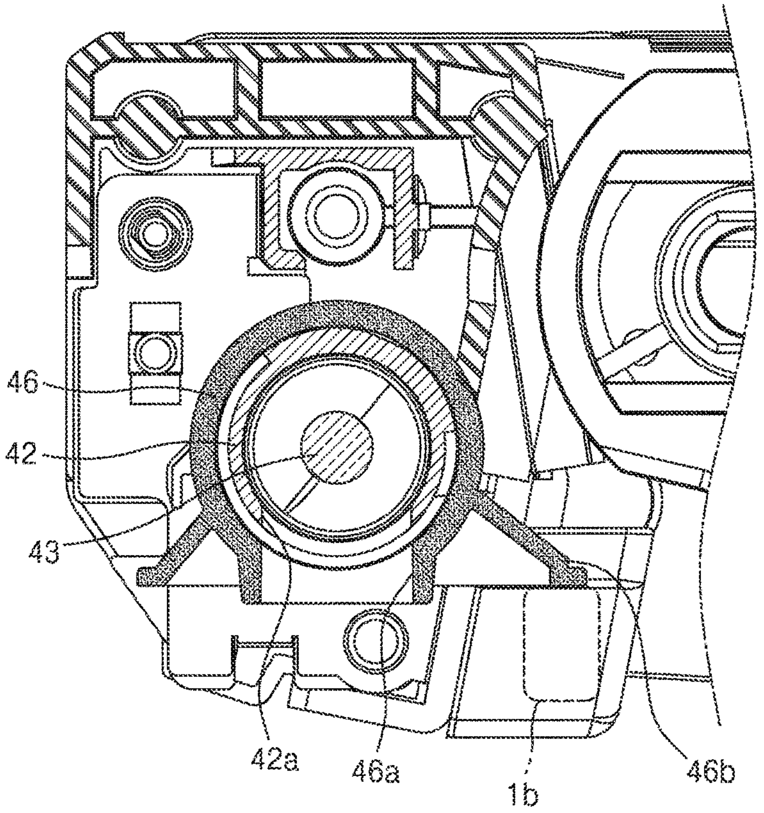
FIG. 6 is a cross-sectional view taken along the line X1-X1' of FIG. 3, showing a state in which the shutter is located at an open position to open the first outlet consistent with the disclosure.

Referring back to FIG. 3, the belt cleaner may include a shutter 46 that opens and closes the first outlet 42*a*. The shutter 46 may be elastically biased by a spring 44 to be located at a position to block the first outlet 42*a*. FIG. 5 is a cross-sectional view taken along line X1-X1' of FIG. 3, showing a state in which the shutter 46 is located at a closed position to block the first outlet 42*a* consistent with the disclosure. FIG. 5 illustrates also includes first conveying member 43. FIG. 6 is a cross-sectional view taken along the line X1-X1' of FIG. 3, showing a state in which the shutter 46 is located at an open position to open the first outlet 42*a* consistent with the disclosure. Referring to FIGS. 3, 5, and 6, the discharge duct 42 may have a cylindrical shape extending from one end of the accommodation portion 41 in the width direction Y. The shutter 46 may be supported by the discharge duct 42 to be rotatable to the closed position and the open position. The shutter 46 can include a communication port 46*a* that communicates with the conveying duct described further herein (e.g., conveying duct 4 illustrated in FIG. 7). The shutter 46 may be switched between the open position and the closed position by an operation of being mounted on and/or removed from the main body (e.g., main body 1 illustrated in FIGS. 1 and 2). For example, the shutter 46 may include a lever portion 46*b*. When the intermediate transfer belt assembly 2 is mounted on the main body, the lever portion 46*b* may interfere with an interference portion 1*b* provided in the main body, and thus, the shutter 46 may be rotated from the closed position to the open position. When the intermediate transfer belt assembly 2 is removed from the main body, the shutter 46 may be rotated from the open position to the closed position by an elastic force of the spring 44.

For example, in an example in which the intermediate transfer belt assembly 2 has been removed from the main body, the shutter 46 can be maintained in the closed position as shown in FIG. 5 by the elastic force of the spring 44. The first outlet 42*a* and the communication port 46*a* may be misaligned with each other to close the first outlet 42*a*. The intermediate transfer belt assembly 2 can be inserted into the main body and slid, for example, in a −X direction. The shutter 46 can be maintained in the closed position by the elastic force of the spring 44 until the lever portion 46*b* comes into contact with the interference portion 1*b*. When the intermediate transfer belt assembly 2 is slid in the −X direction after the lever portion 46*b* has come into contact with the interference portion 1*b*, the shutter 46 can be rotated. When the intermediate transfer belt assembly 2 reaches a mounting position, the shutter 46 can be switched to the open position as shown in FIG. 6. The first outlet 42*a* and the communication port 46*a* may be aligned with each other, and the waste toner may be discharged from the accommodation portion 41 of the belt cleaner through the first outlet 42*a* and the communication port 46*a*. In the example shown in FIG. 6, when the intermediate transfer belt assembly 2 is slid in a +X direction to be removed from the main body, as the lever portion 46*b* moves away from the interference portion 1*b*, the shutter 46 can be rotated by the elastic force of the spring 44 and switched from the open position to the closed position.

Figure 7:
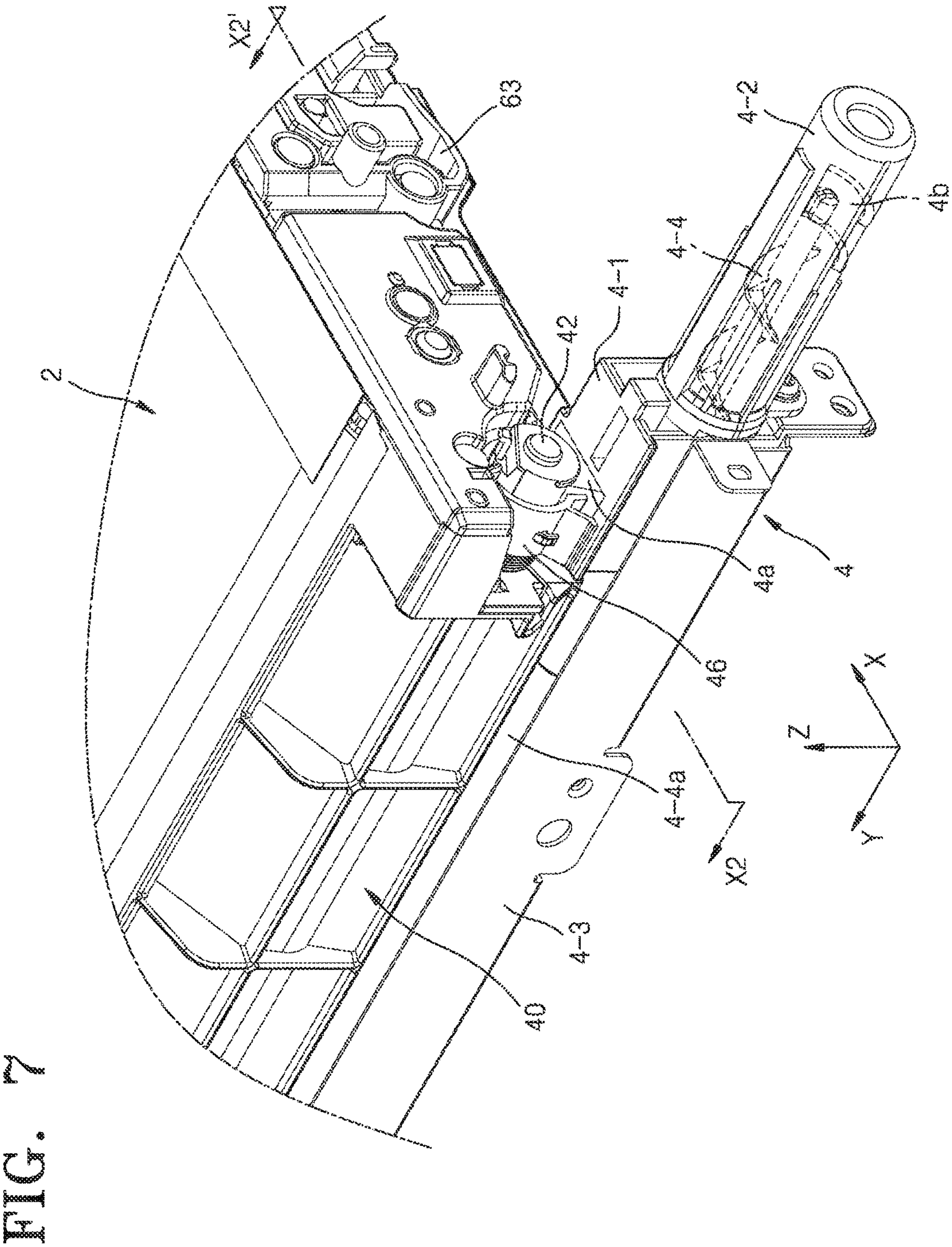
FIG. 7 is a partial perspective view of an example of a positional relationship between a discharge duct and a conveying duct in a state in which an intermediate transfer belt assembly is mounted on a main body consistent with the disclosure.
Figure 8:
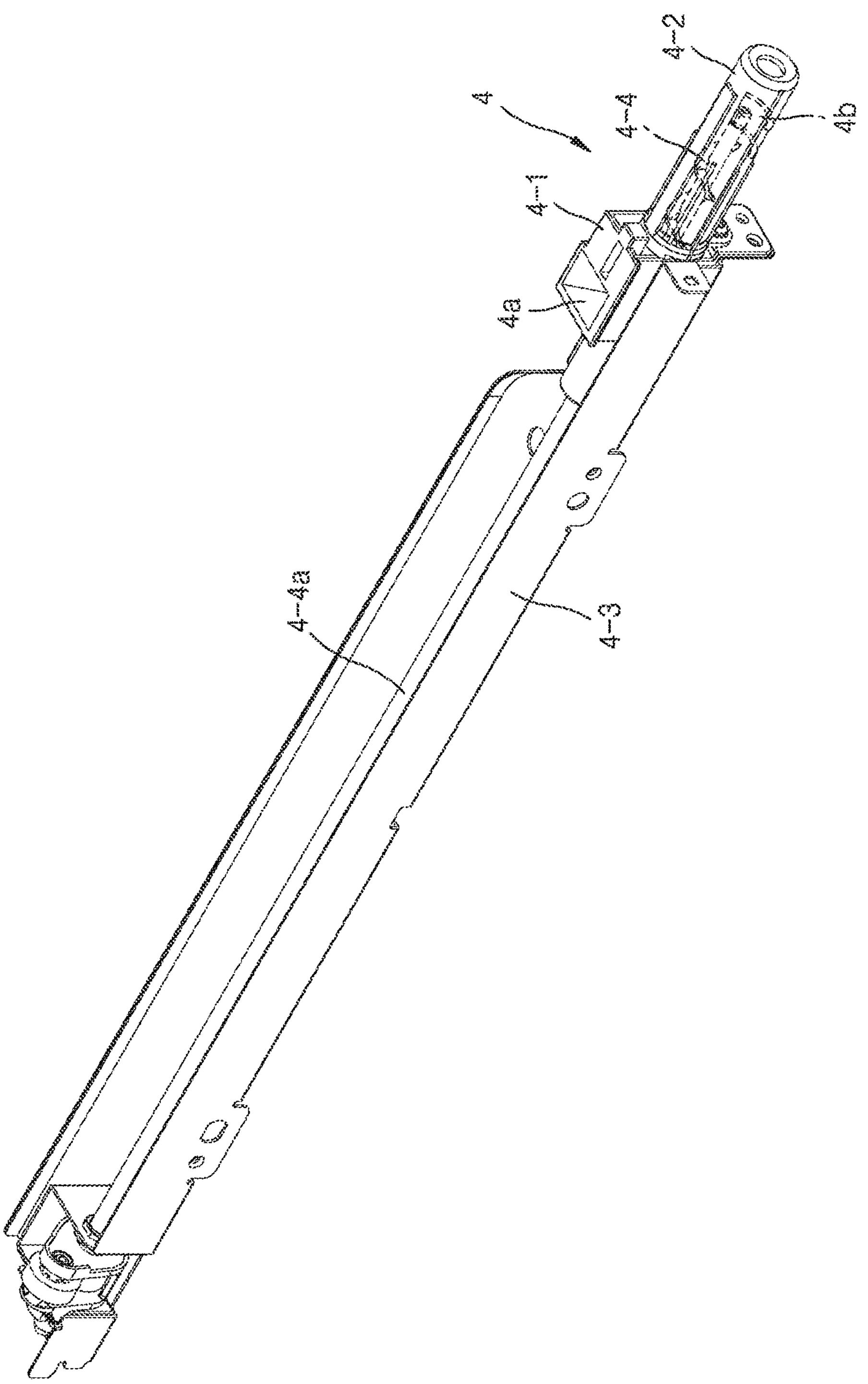
FIG. 8 is a perspective view of an example of a conveying duct consistent with the disclosure.
Figure 9:
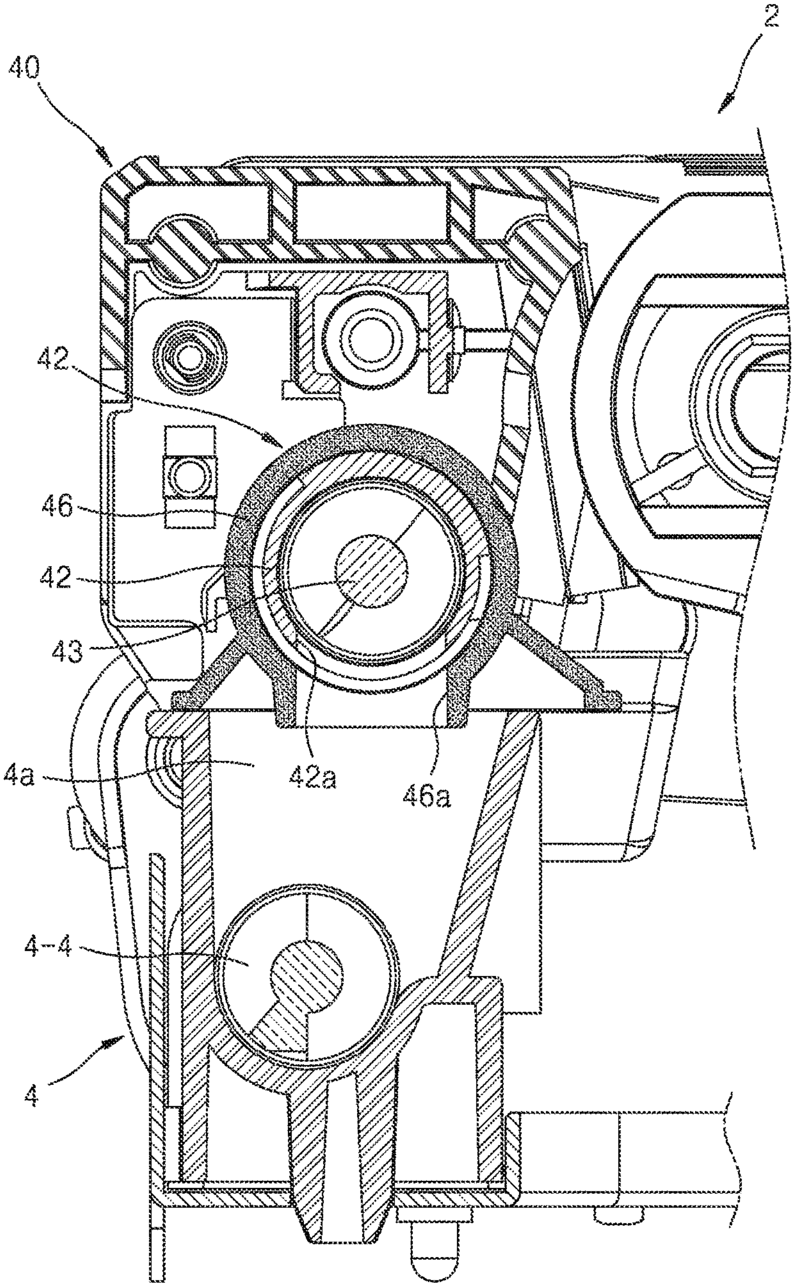
FIG. 9 is a cross-sectional view taken along line X2-X2' of FIG. 7 consistent with the disclosure.

FIG. 7 is a partial perspective view of an example of a positional relationship between the discharge duct 42 (e.g., supporting the shutter 46) and the conveying duct 4 in a state in which the intermediate transfer belt assembly 2 is mounted on the main body (e.g., main body 1 illustrated in FIGS. 1 and 2) consistent with the disclosure. FIG. 7. Also illustrates the bell frame 63. FIG. 8 is a perspective view of an example of the conveying duct (e.g., conveying duct 4 illustrated in FIG. 7) consistent with the disclosure. FIG. 9 is a cross-sectional view taken along line X2-X2' of FIG. 7 consistent with the disclosure.

Figure 11:
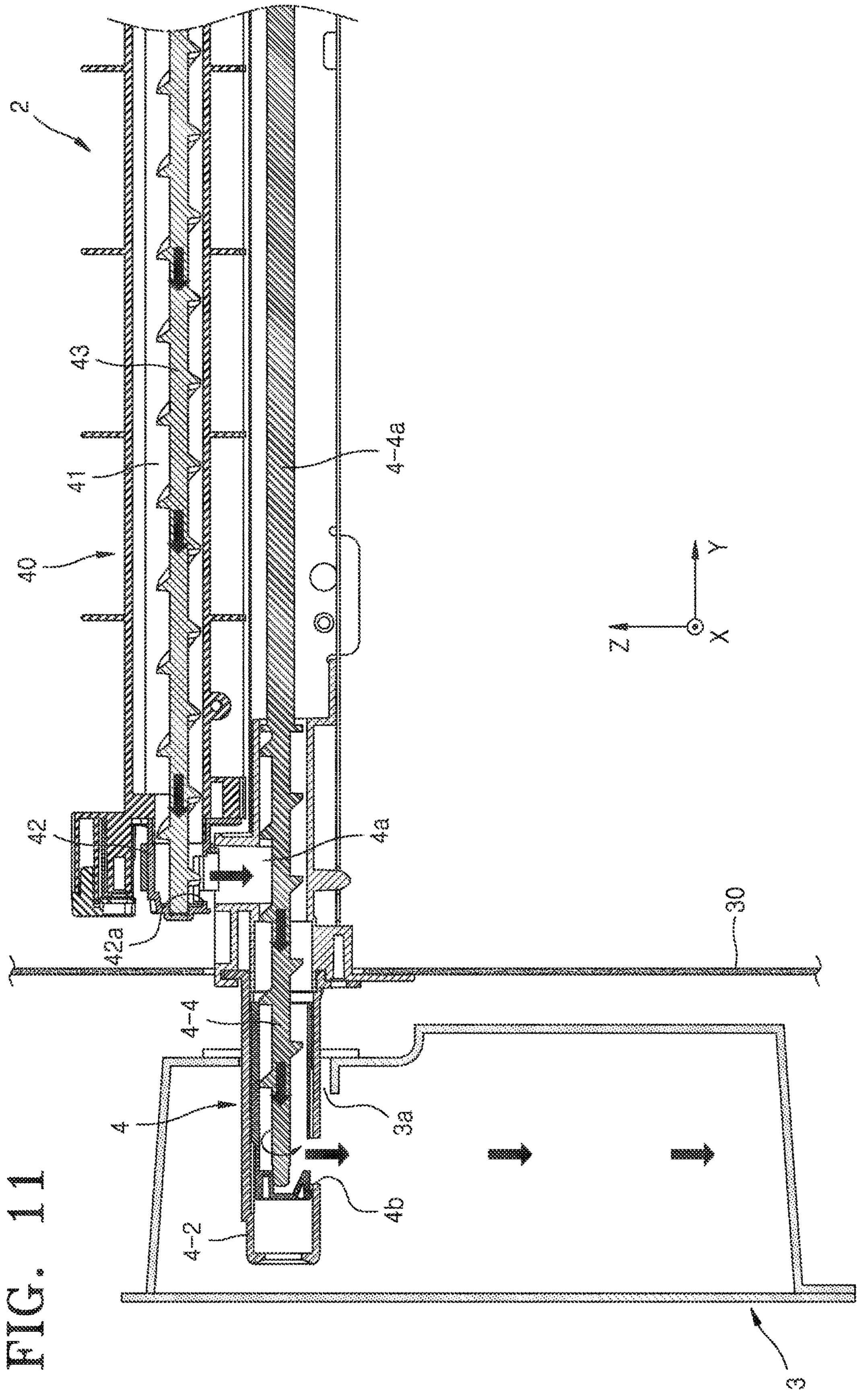
FIG. 11 is a cross-sectional view taken along line Z1-Z1' of FIG. 1 consistent with the disclosure.

Referring to FIGS. 7 to 9, the conveying duct 4 may include a first end 4-1 and a second end 4-2. The first end 4-1 can include an inlet 4*a* facing the first outlet 42*a* of the discharge duct 42 such that the waste toner flows thereinto when the intermediate transfer belt assembly 2 is mounted on the main body. The second end 4-2 can include a second outlet 4*b* through which the waste toner is discharged into the waste toner container (e.g., waste toner container 3 illustrated in FIGS. 1 and 2). For example, the inlet 4*a* can be located below the first outlet 42*a*. The second outlet 4*b* may be formed to be open downward from the second end 4-2. When the waste toner container is mounted on the main body, the second end 4-2 may be inserted into the waste toner container as shown in FIG. 11. As a result, the waste toner may be discharged into the waste toner container through the second outlet 4*b*.

The conveying duct 4 can be fixedly arranged in the main body. The conveying duct 4 may be supported by the main body. For example, the conveying duct 4 may be supported by a duct frame 4-3, and the duct frame 4-3 may be supported by the main body. When the intermediate transfer belt assembly 2 is mounted on the main body 1, the conveying duct 4 can be connected to the belt cleaner 40, for example, the discharge duct 42, to form a discharge passage for the waste toner from the belt cleaner 40 to the waste toner container. Accordingly, the discharge duct 42 may not extend to the waste toner container. The above example may allow the intermediate transfer belt assembly 2 including the belt cleaner 40 to be slid in the driving direction X to be mounted on and removed from the main body.

A second conveying member (e.g., a second auger) 4-4 including a rotation shaft 4-4*a* may be arranged inside the conveying duct 4 to convey the waste toner to the waste toner container while being rotated. For example, the second conveying member 4-4 may include a rotation shaft extending in the width direction Y, and a spiral wing formed on the rotation shaft. The second conveying member 4-4 may be rotated in connection with one of the plurality of support rollers (e.g., support rollers 62*a*, 62*b*, 62*c*, and 62*d* illustrated in FIGS. 1 and 2). For example, the second conveying member 4-4 may be rotated in connection with the support roller located closest thereto. The second conveying member 4-4 may be rotated in connection with the first conveying member 43. As a result, the second conveying member 4-4 may be rotationally driven without using a separate actuator, such as a motor.

Figure 10:
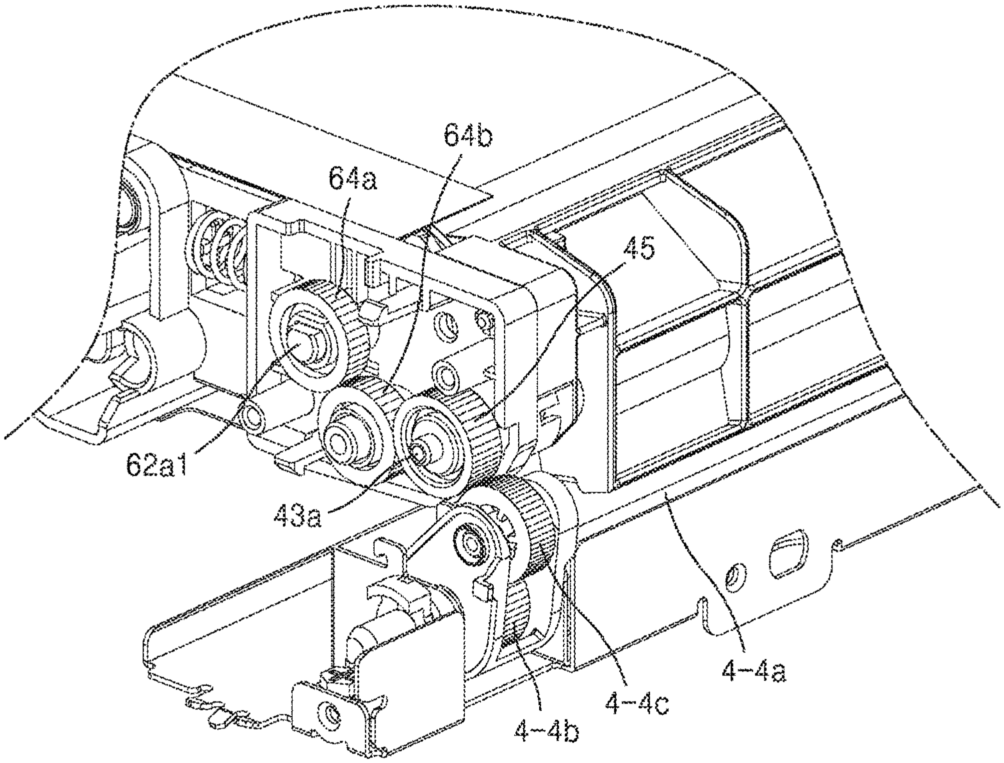
FIG. 10 is a partial perspective view of an example of a structure for rotating a second conveying member consistent with the disclosure.

FIG. 10 is a partial perspective view of an example of a structure for rotating the second conveying member (e.g., second conveying member 4-4 illustrated in FIG. 9) consistent with the disclosure. Referring to FIGS. 8 and 10, a rotation shaft 4-4*a* of the second conveying member may extend beyond the first end 4-1 of the conveying duct (e.g., conveying duct 4 illustrated in FIG. 7). A gear 4-4*b* may be coupled to an end of the rotation shaft 4-4*a*. The gear 64*a* may be coupled to one end of the rotation shaft 62*al* of the support roller (e.g., support roller 62*a* illustrated in FIGS. 1 and 2). The gear 64*a* can be engaged with the gear 4-4*b* via the gear 64*b*, the gear 45, and a gear 4-4*c*. In the example, the second conveying member (e.g., a second auger) may be rotated in connection with the first conveying member (e.g., the first auger, first conveying member 43 illustrated in FIG. 9). As shown in FIG. 10, the gear 45 can be connected to the rotation shaft 43*a* of the first conveying member, and the gear 45 can be connected to the gear 4-4*b*, which can be coupled to the rotation shaft 4-4*a* of the second conveying member, via the gear 4-4*c*.

FIG. 11 is a cross-sectional view taken along line Z1-Z1' of FIG. 1 consistent with the disclosure. Referring to FIGS. 1 to 11, a process of discharging the waste toner removed from the intermediate transfer belt 60 to the waste toner container 3 will be described. As illustrated in FIG. 11, a main frame 30 can be included in the main body 1. The intermediate transfer belt assembly 2 can be slidably supported by the main frame 30 in the driving direction X. The conveying duct 4 can be fixedly supported by, for example, the main frame 30. The waste toner container 3 can be located, for example, on one side of the intermediate transfer belt 60 in the width direction Y. Specifically, the waste toner container 3 can be located outside the main frame 30. The waste toner container 3 may be replaced in the width direction Y. When the waste toner container 3 is mounted on the main body 1, the second end 4-2 of the conveying duct 4 can be inserted into the waste toner container 3 via an opening 3*a* provided in the waste toner container 3. The second outlet 4*b* can be located inside the waste toner container 3.

As shown in FIG. 2, the door 1*a* of FIG. 2 may be opened, and the intermediate transfer belt assembly 2 may be slid in the driving direction X, for example, the −X direction, to be mounted on the main body 1. In this example, as described above with reference to FIGS. 5 and 6, the shutter 46 can be rotated from the closed position to the open position due to interference between the lever portion 46*b* and the interference portion 1*b* provided in the main body 1. When the intermediate transfer belt assembly 2 reaches the mounting position, as shown in FIGS. 9 and 11, the first outlet 42*a* of the discharge duct 42 and the inlet 4*a* of the conveying duct 4 can face each other in a vertical direction. Because the shutter 46 is located at the open position, the waste toner may be discharged from the discharge duct 42 to the conveying duct 4. Printing may be performed in the state shown in FIG. 1 by closing the door 1*a*.

When printing is performed, toner remaining on the surface of the intermediate transfer belt 60 after transfer can be removed from the intermediate transfer belt 60 by a cleaning member. The waste toner can be accommodated in the accommodation portion 41. The first conveying member (e.g., the first auger) 43 inside the accommodation portion 41 can be rotated in connection with the support roller 62*a*. The first conveying member (e.g., the first auger) 43 can convey the waste toner toward the conveying duct 4 in the width direction Y. The waste toner can be conveyed to the discharge duct 42. The first conveying member (e.g., the first auger) 43 may extend into the discharge duct 42. The waste toner can be conveyed along the discharge duct 42 to be discharged through the first outlet 42*a* and can flow into the conveying duct 4 through the inlet 4*a*. The second conveying member 4-4 can convey the waste toner inside the conveying duct 4 to the second outlet 4*b*. The waste toner may fall from the second outlet 4*b* to be loaded into the waste toner container 3.

Because the first conveying member 43 is rotated in connection with one of the support rollers 62*a*, 62*b*, 62*c*, and 62*d*, for example, the support roller 62*a*, which support and drive the intermediate transfer belt 60, a separate actuator for rotating the first conveying member 43 may not be used. Accordingly, the structure of the intermediate transfer belt assembly 2 may be simplified, and the cost of the intermediate transfer belt assembly 2, which is a consumable, may be reduced. Because the second conveying member 4-4 is rotated in connection with the first conveying member 43 and/or one of the support rollers 62*a*, 62*b*, 62*c*, and 62*d*, for example, the support roller 62*a*, which support and drive the intermediate transfer belt 60, a separate actuator for rotating the second conveying member 4-4 may not be used. The structure of the printing apparatus may be simplified, and an increase in the price of the printing apparatus may be reduced. Although not shown in the drawing, waste toner discharged from the plurality of developing devices 10 may flow into and be accommodated in the waste toner container 3.

When the service life of the intermediate transfer belt 60 expires, the intermediate transfer belt assembly 2 may be removed from the main body 1, and a new intermediate transfer belt assembly 2 may be mounted on the main body 1. As shown in FIG. 2, the door 1*a* can be opened to open a side of the main body 1, for example, in the driving direction X. The intermediate transfer belt assembly 2 can be slid in the driving direction X, for example, the +X direction. As the intermediate transfer belt assembly 2 is slid in the +X direction, the discharge duct 42 can be spaced apart from the conveying duct 4. The lever portion 46*b* of the shutter 46 can be spaced apart from the interference portion 1*b* of the main body 1, and the shutter 46 can be rotated from the open position to the closed position by the elastic force of the spring 44. As a result, leakage of the waste toner during a process of replacing the intermediate transfer belt assembly 2 may be reduced or prevented. The intermediate transfer belt assembly 2 may be slid in the +X direction to be completely removed from the main body 1. Then, a new intermediate transfer belt assembly 2 may be slid in the driving direction X, for example, the −X direction, to be mounted on the main body 1.

As such, by employing the conveying duct 4, the intermediate transfer belt assembly 2 including the intermediate transfer belt 60 and the belt cleaner 40 may be a consumable that is replaceable by a user. Because the belt cleaner 40 is not disassembled when replacing the intermediate transfer belt assembly 2, the process of replacing the intermediate transfer belt assembly 2 may be simplified, thereby improving user convenience. Because a separate actuator for driving the first and second conveying members 43 and 4-4 may not be used, an internal space of the printing apparatus may be efficiently used, and a conveying mechanism for conveying the waste toner removed from the intermediate transfer belt 60 to the waste toner container 3 at a lower cost may be implemented. Because the belt cleaner 40 may be integrally replaced with the intermediate transfer belt assembly 2, the reliability of the mechanism for conveying the waste toner removed from the intermediate transfer belt 60 may be maintained.

It should be understood that examples described herein should be considered in a descriptive sense and not for purposes of limitation. Descriptions of features or aspects within each example should be considered as available for other similar features or aspects in other examples. While examples have been described with reference to the figures, it will be understood that various changes in form and details may be made therein without departing from the spirit and scope as defined by the following claims.

What is claimed is:

1. A printing apparatus comprising:
a photoconductor on which a toner image is formed;
an intermediate transfer belt to which the toner image is transferred;
a belt frame to support the intermediate transfer belt; and
a belt cleaner including an accommodation portion and a discharge duct, the accommodation portion to accommodate waste toner removed from the intermediate transfer belt, and the discharge duct extending from the accommodation portion in a width direction of the intermediate transfer belt and provided with a first outlet through which the waste toner is discharged,
wherein the discharge duct is located inside the belt frame in the width direction.

2. The printing apparatus of claim 1, wherein the discharge duct extends in the width direction from one end of the accommodation portion in the width direction.

3. The printing apparatus of claim 1, wherein the belt cleaner includes a first conveying member to convey the waste toner to the first outlet, and
the first conveying member is rotated in connection with one of a plurality of support rollers to support and drive the intermediate transfer belt.

4. The printing apparatus of claim 1, wherein the intermediate transfer belt, the belt frame, and the belt cleaner form an intermediate transfer belt assembly which is replaceable by being slid in a driving direction of the intermediate transfer belt.

5. The printing apparatus of claim 1, further comprising:
a waste toner container; and
a conveying duct to receive the waste toner from the discharge duct and convey the waste toner to the waste toner container.

6. The printing apparatus of claim 5, wherein the conveying duct includes a first end including an inlet facing the first outlet and into which the waste toner flows, and a second end inserted into the waste toner container and including a second outlet through which the waste toner is discharged into the waste toner container.

7. The printing apparatus of claim 5, comprising a second conveying member to convey the waste toner to the waste toner container while being rotated inside the conveying duct.

8. The printing apparatus of claim 7, comprising a plurality of support rollers to support the intermediate transfer belt and drive the intermediate transfer belt,
wherein the second conveying member is rotated in connection with one of the plurality of support rollers.

9. The printing apparatus of claim 1, wherein the discharge duct does not protrude from the belt frame in the width direction.

10. A printing apparatus comprising:
a main body including a photoconductor on which a toner image is formed;
an intermediate transfer belt assembly including an intermediate transfer belt to which the toner image is transferred, a belt frame to support the intermediate transfer belt, and a belt cleaner to remove waste toner from the intermediate transfer belt, wherein the intermediate transfer belt assembly is mountable on and removeable from the main body in a driving direction of the intermediate transfer belt;
a waste toner container; and
a conveying duct provided in the main body and connected to the belt cleaner when the intermediate transfer belt assembly is mounted on the main body to form a discharge passage for the waste toner from the belt cleaner to the waste toner container.

11. The printing apparatus of claim 10, wherein the belt cleaner includes an accommodation portion and a discharge duct, the accommodation portion to accommodate the waste toner removed from the intermediate transfer belt, and the discharge duct extending in a width direction from one end of the accommodation portion in the width direction and connected to the conveying duct when the intermediate transfer belt assembly is mounted on the main body, and
the discharge duct is located inside the belt frame in the width direction.

12. The printing apparatus of claim 11, wherein a first outlet through which the waste toner is discharged is provided in the discharge duct, and
wherein the conveying duct includes:
an inlet facing the first outlet such that the waste toner flows thereinto when the intermediate transfer belt assembly is mounted on the main body; and
a second outlet through which the waste toner is discharged into the waste toner container.

13. The printing apparatus of claim 11, further comprising:
a first auger to convey the waste toner inside the accommodation portion to the first outlet; and
a second auger arranged inside the conveying duct to convey the waste toner to the waste toner container.

14. The printing apparatus of claim 13, comprising a plurality of support rollers to support the intermediate transfer belt and drive the intermediate transfer belt,
wherein the second auger is rotated in connection with one of the plurality of support rollers.

15. The printing apparatus of claim 13, wherein the second auger is rotated in connection with the first auger.

16. An intermediate transfer belt assembly comprising:
an intermediate transfer belt;
a belt frame to support the intermediate transfer belt;
an accommodation portion to accommodate waste toner removed from the intermediate transfer belt; and
a discharge duct extending from the accommodation portion in a width direction of the intermediate transfer belt and including an outlet through which the waste toner is discharged,
wherein the discharge duct is located inside the belt frame in the width direction.

* * * * *